UNITED STATES PATENT OFFICE.

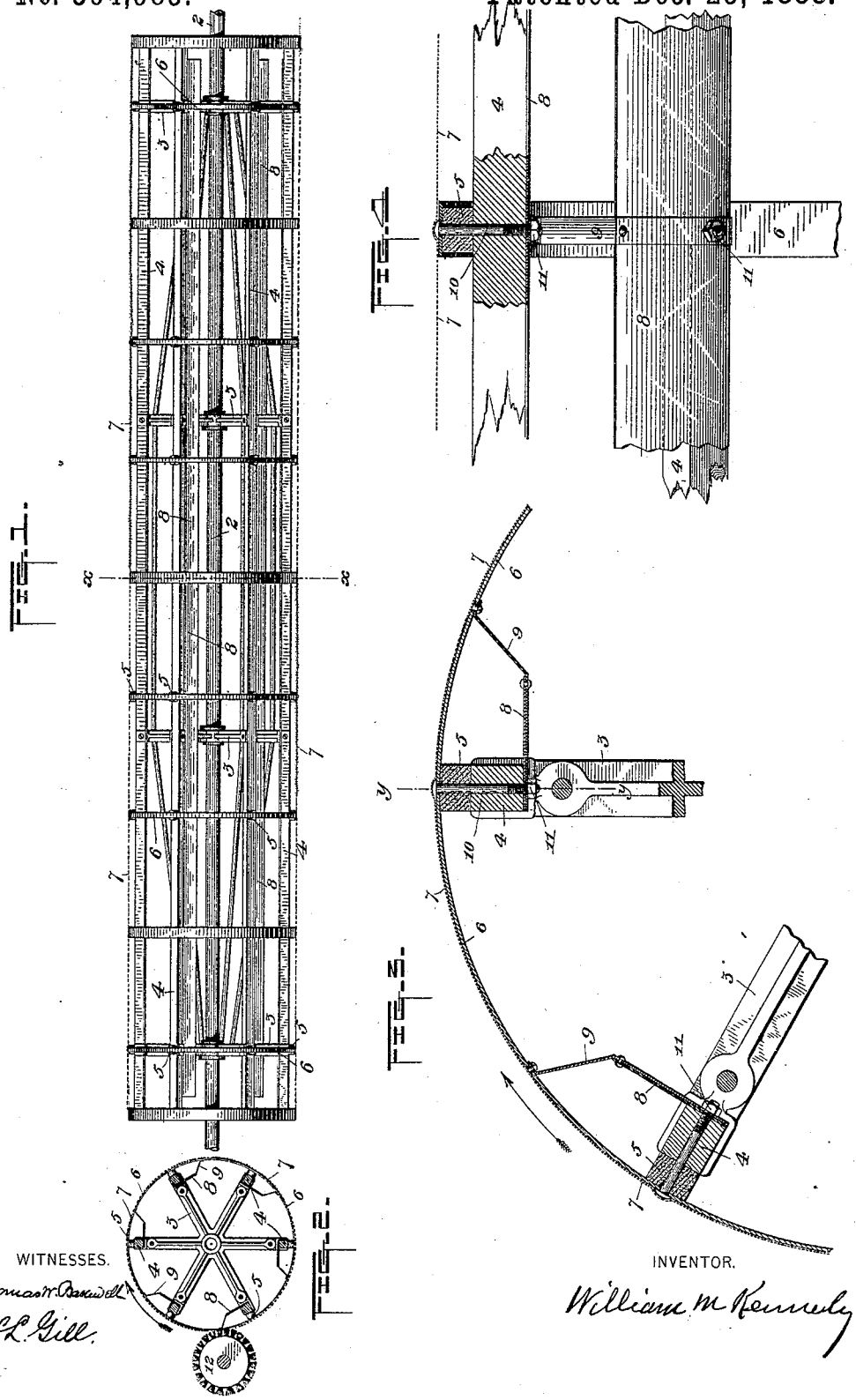

WILLIAM M. KENNEDY, OF PITTSBURG, PENNSYLVANIA.

ROTARY BOLT.

SPECIFICATION forming part of Letters Patent No. 394,985, dated December 25, 1888.

Application filed March 27, 1888. Serial No. 268,652. (No model.)

*To all whom it may concern:*

Be it known that I, WILLIAM M. KENNEDY, of Pittsburg, in the county of Allegheny and State of Pennsylvania, have invented a new and useful Improvement in Rotary Bolting-Reels for Flour-Mills; and I do hereby declare the following to be a full, clear, and exact description thereof, reference being had to the accompanying drawings, forming part of this specification, in which—

Figure 1 is a plan view of the frame of one of my improved reels. Fig. 2 is an end view thereof. Fig. 3 is an enlarged cross-sectional view of a part of the periphery of the reel. Fig. 4 is a longitudinal section of a part of the reel on the line $y\ y$ of Fig. 3.

Like symbols of reference indicate like parts in each.

My invention relates to an improvement in bolting-reels used in the manufacture of flour, its object being to provide a reel which shall be perfectly cylindrical in outline.

In constructing a reel according to my invention, or in changing a reel of polygonal form, I take a frame having a central shaft or axis, a number of radially-projecting spokes or arms, and longitudinal ribs or bars connecting the ends of these spokes. Around the frame thus constructed I fit circular hoops, preferably of metal, which are supported on the longitudinal ribs by means of springs. The silk bolting-cloth is stretched around the periphery of the reel, and by reason of the use of the springs, as hereinafter explained, a true circular outline can be given to the hoops.

My invention consists in the use of these supporting-springs, which, for reasons of economy, are preferably made of rubber, in combination with adjusting devices—such as clamps consisting of bolts or the like—by which they may be contracted or permitted to expand, thus enabling the distance of the several supports of the hoops from the center of the reel to be adjusted, so that by properly contracting some of the springs and allowing others to expand the hoops may be kept at their points of support equidistant from the axis of the reel. As nearly a perfect cylindrical form as possible is thus given to the reel, and by reason of the even distribution of the flour thus obtained the reel is more efficient in its action and the flour produced is better in quality and freer from specks than that which has been bolted in a reel of irregular shape.

A special advantage which I derive from having the reel accurately cylindrical in outline is that I am enabled thus to keep the cloth covering of the reel in all parts free from the clogging action of the flour, because the rotary brush usually employed for the purpose is caused to come into contact with every portion of the reel, while if the reel be not a true cylinder parts of it will not be touched by the brush and will be clogged up with flour.

I shall now describe my invention particularly with reference to the drawings.

In the drawings, 2 represents the axial shaft of the reel, 3 are the radial spokes, and 4 are the longitudinal ribs which connect the ends of the spokes. On the outer sides of the ribs 4, at intervals, I place spring-blocks 5, and on these springs are fitted the circular hoops 6, which impart the cylindrical form to the reel. The usual silk covering, 7, is stretched upon these hoops, and, as shown in Fig. 4, it is preferably held by the supporting-springs out from the longitudinal ribs, so as to afford intervening spaces, giving an unobstructed path of limited size to the flour to secure its even feeding around the periphery of the reel.

In order to assist in the distribution of the flour in the reel and to regulate and facilitate its uniform passage through the spaces between the longitudinal ribs and the covering, I prefer to provide the reel with feeder-plates 8, which project from the under sides of the ribs, and are preferably connected with the hoops by spiders or braces 9. As the reel rotates on its axis the feeders take up the flour and allow it partially to fall back against the covering through the spaces outside the longitudinal ribs and discharge the remainder from their forward edges after the feeders have passed their highest position.

12 is a brush, which is set adjacent to and parallel with the periphery of the reel, so that as the reel rotates, the brush, being in contact with its silk covering, shall act thereon so as to clear the covering from flour, which would otherwise settle in its interstices and choke it. When the reel is perfectly cylindrical, every part of the surface of the reel is swept by the brush, and the reel is thus kept much cleaner and freer to act in bolting the flour than if the reel be of irregular surface outline, in which case there will be parts untouched by the brush.

I shall now describe the use of the springs 5 in adjusting the peripheral shape of the reel. The bolts 10, by which they are clamped, pass through the springs and the rib below them, preferably also through the hoop above the springs, and on the ends of the bolts are nuts 11, by means of which the springs may be contracted to shorten the distance between the hoop and the axis of the cylinder, or may be allowed to expand to increase this distance, as may be desired to secure proper relative adjustment of all the springs in order that the outline of the skeleton reel formed by the hoops may be truly cylindrical.

Besides the advantages resulting in the use of my improvement which I have already indicated, its simplicity of construction and the ease with which it may be applied to reels of the kinds now in use make it desirable. For example, to apply it to an ordinary polygonal reel I simply remove the bolting-cloth, set in place the spring-blocks 5 and the encircling hoops 6, and replace the cloth. The circumference of the hoops is adjusted into proper circular form by means of the nuts 11, as before explained. All this may be done very rapdily and without removing the reel from its setting.

I do not claim, broadly, blocks which separate the longitudinal ribs from the bolting-cloth, nor the feeders for distributing the flour; but

I claim—

As an improvement in rotary bolting-reels for flour-mills, the combination, with the frame of the reel and the covering, of circular hoops encircling the frame, on which hoops the covering is placed, springs supporting the hoops, and clamps by which the springs may be compressed or permitted to expand, whereby the supporting-springs may be relatively adjusted to afford the proper circular form to the hoops, substantially as and for the purposes described.

In testimony whereof I have hereunto set my hand this 19th day of March, A. D, 1888.

WILLIAM M. KENNEDY.

Witnesses:
 W. B. CORWIN,
 JNO. K. SMITH.